Sept. 12, 1950

M. G. RABON 2,521,871

PUMP OPERATOR

Filed Jan. 11, 1949

Inventor

Melton G. Rabon

By Clarence A. O'Brien
and Harvey B. Jacobson
Attorneys

Sept. 12, 1950 M. G. RABON 2,521,871
PUMP OPERATOR
Filed Jan. 11, 1949 2 Sheets-Sheet 2
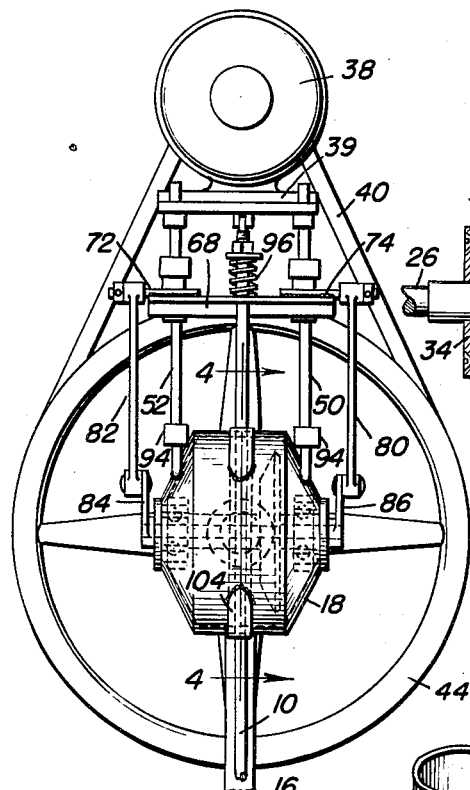
Fig. 3.
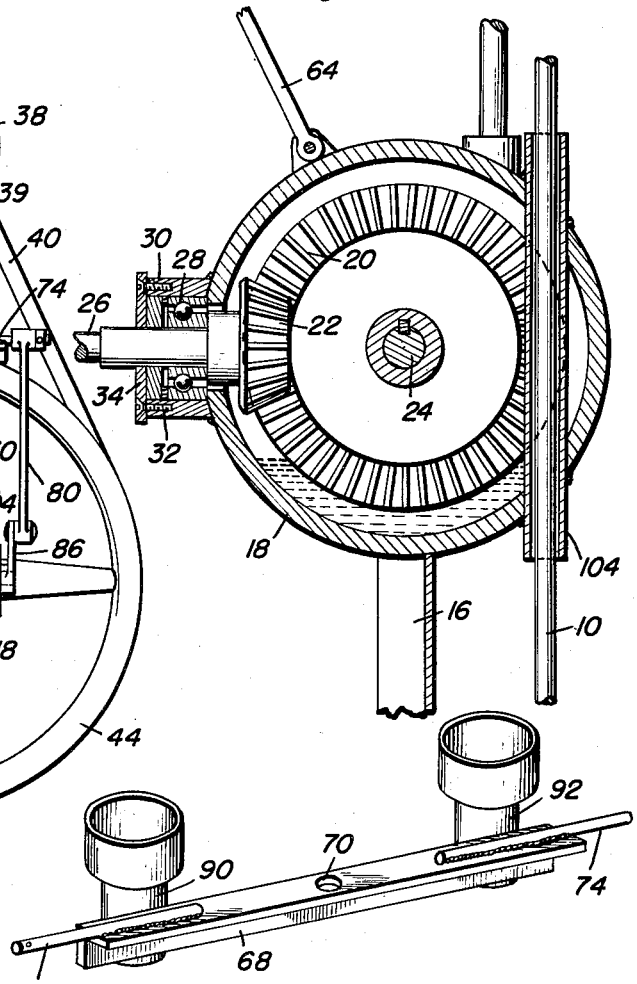
Fig. 4.
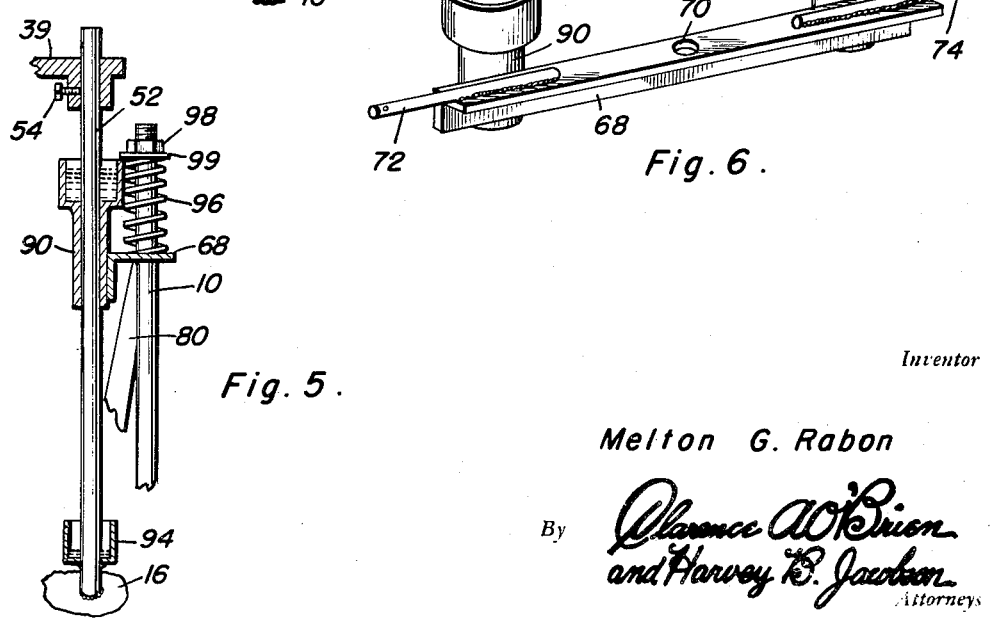
Fig. 5.
Fig. 6.
Inventor
Melton G. Rabon
By Clarence A. O'Brien
and Harvey B. Jacobson
Attorneys Patented Sept. 12, 1950

2,521,871

UNITED STATES PATENT OFFICE 2,521,871

PUMP OPERATOR

Melton G. Rabon, Columbia, S. C., assignor of one-half to E. G. Bumgardner, Columbia, S. C.

Application January 11, 1949, Serial No. 70,206

2 Claims. (Cl. 74—44)

This invention relates to new and useful improvements in operators for pumps.

An object of this invention is to operate a push rod of a pump or operate any other conventional element of a pump by improved means, which means includes a transmission housing sealed for the purpose of retaining lubricant therein and having a guide to pass a rod therethrough unexposed to the lubricant in the housing, adjustable means supporting a motor for operating the transmission which is carried by the transmission housing or case, and a cross head slidable on a part of said motor supporting means.

Another object of this invention is to lubricate the sliding elements in the cross head and supporting means constantly and also to absorb shocks by means of a resilient shock absorber carried by the cross head, which shock may be introduced upon reciprocation of the said cross head.

Ancillary objects and features of novelty will become apparent to those skilled in the art, in following the description of the preferred form of the invention, and illustrated in the accompanying drawings, wherein:

Figure 3 is a rear view of the device shown in Figure 2;

Figure 4 is a sectional view taken on the line 4—4 of Figure 3 and in the direction of the arrows;

Figure 5 is an enlarged sectional detail of construction taken on a line 5—5 of Figure 2 and in the direction of the arrows, and;

Figure 6 is a perspective view of a portion of the cross head used in conjunction with the invention.

Figure 1:
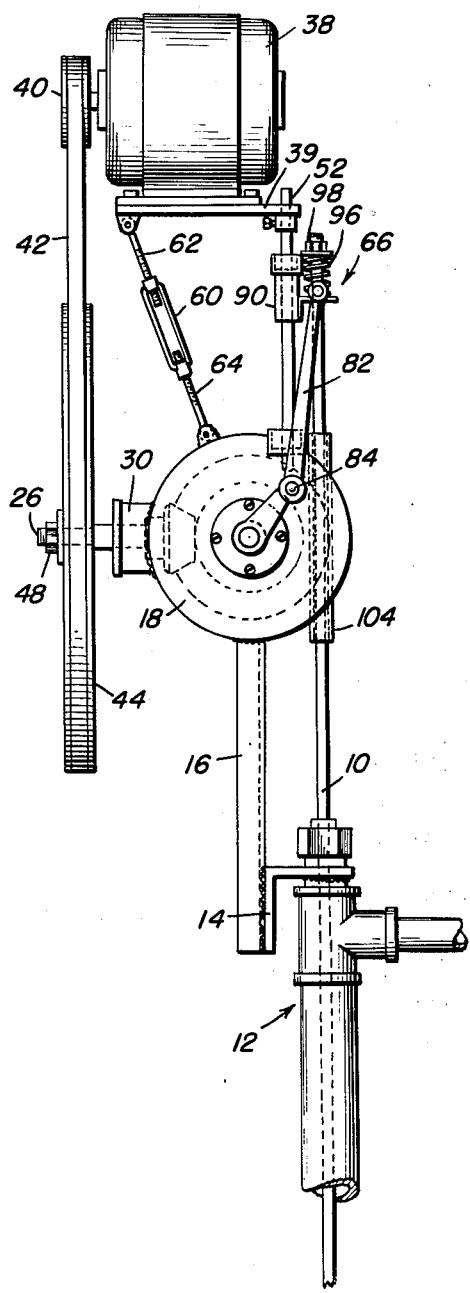
Figure 1 is a plan view of a preferred form of the invention.
Figure 2:
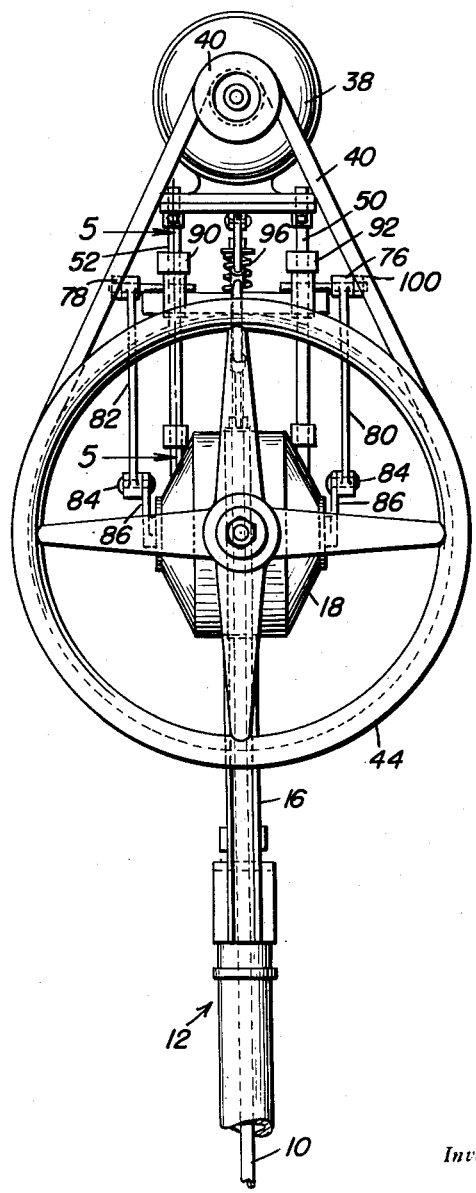
Figure 2 is a view taken at substantially right angles to that shown in Figure 1.

This invention relates generally to an improved operator for a pump. The principles involved may be adapted for use in conjunction with other types of pumps, particularly those which include a push rod 10. Illustrated in the drawings is a fragmentary portion of a conventional pump 12 which includes the said push rod and which is mounted in any conventional and usual fashion. Fixed to a portion of the pump is an angle iron support 14 which has a standard 16 fixed thereto by any suitable means such as welding, brazing, molding or the like. At the other end of the said standard 16 there is supplied a transmission housing or case 18 which is preferably sealed having a lubricant therein.

A transmission is disposed in said housing 16 and includes a ring gear 20 and pinion 22 mounted on transversely disposed shafts 24 and 26 respectively. An anti-friction bearing structure 28 is disposed in a small case 30 which is fixed to one side of the housing 16 and an oil seal 32 is supplied at the end of the small case 30. A suitable cap 34 retains the oil seal and bearing assembly in place.

A motor 38 is used for the purpose of operating the transmission and is disposed on a platform 39. A pulley 40 is fixed to the drive shaft of the motor and has a belt 42 entrained therearound which is also entrained around a pulley 44. The last named pulley is fixed to the shaft 26 by any suitable means and is retained in place by a nut 46. Hence, upon actuation of the motor 38 the shaft 24 will be operated through the intermediate described structure. Further, it is within the purview of the invention to utilize other types of drives which are in themselves conventional in character, in lieu of the belt and pulley arrangement.

Means supporting the platform 39 for adjustment is supplied. This means consists of a pair of rods 50 and 52 respectively which are fixed at one end to the case or housing 16 and which pass through suitable openings in the platform 39. Set screws 54 are carried by the platform and operatively engage the rods in order to retain the platform in selected adjusted positions on the rods. It is within the purview of the invention to utilize conventional nuts and end threaded portions on the rods 50 and 52 in lieu of the set screws, as found desirable.

Also forming a portion of the platform supporting means is one or more turn buckles 60 having eye bolts 62 and 64 extending therefrom and pivotally connected to the undersurface of the platform 39 and the case or housing 16 respectively. Hence, upon conventional manipulation of the turn buckle or buckles 16 the front end of the platform may be raised or lowered. By movement of the motor with respect to the housing 16 the belt 42 may be selectively tightened and loosened.

Slidably disposed on a portion of the platform supporting means is a cross head generally indicated at 66. This cross head consists of (Figure 6) an angle iron 68 having an opening 70 therein and having trunnions 72 and 74 respectively extending from opposite ends thereof. The trunnions have bearings 76 and 78 respectively mounted for rotation thereon. These bearings are formed at the ends of the connecting rods 80 and 82 respectively which have similar bearings at the opposite ends fixed to suitable pins 84. The pins 84 are carried by the cranks 86 and 88 respectively. These cranks are fixed to the shaft 24 and derive movement therefrom.

In operation it may now be seen that upon rotation of the shaft 24 the cross head member 68 is raised and lowered, it being restricted in its travel by means of the combination free bearings and lubricant receptors 90 and 92 respectively. Two of these members are fixed to the angle iron 68 and are disposed for sliding movement on the rods 50 and 52 respectively. Lubricants being disposed in the enlarged cup-shaped ends thereof, as seen in Figure 5 will constantly lubricate the sleeve-type bearing portion and the rods 52 and 50 respectively. In order to retain the drippings from this lubrication system receptacles 94 are carried by the lower ends of the rods 50 and 52.

The push rod 10 is passed through the opening 70 in the angle iron member 68 in order that movement of the cross head 66 may be imparted to the said push rod 10. This is accomplished through the medium of a shock absorber or resilient urging or biasing means. This last named means is preferably in the form of a conventional coil spring 96 which is disposed on the angle iron member 68 and is concentric with the push rod 10 (Figure 5). A nut or other suitable limiting means 98 is disposed on the end of the push rod 10 and has a washer 99 thereunder bearing on the opposite end of the spring 96. Hence, the spring acts as a shock absorber and is used as a resilient drive for raising the push rod. In instances wherein it is necessary to apply force both to raise and lower the push rod, a similar spring construction is disposed directly beneath the pertinent flange of the angle iron 68. However, in most constructions it is necessary only to raise the push rod, the same falling by the pull of gravity.

Certain structural expedients may be resorted to in connection with the preferential form of the invention. An example is the utility of the thrust bearings 100 which are disposed at the ends of the trunnions 72 and 74 respectively in order to retain the bearings 76 and 78 in position with respect to lateral movement. Nuts may be supplied in lieu of the set screws therein illustrated and also, the said trunnions 72 and 74 may be obviated entirely in favor of a continuous rod or shaft which extends thereacross.

Due to the construction of the device described and in view of the compactness sometimes essential in the utility of the general class of device described, a guide 104 which is preferably in the form of a sleeve is passed through the transmission housing 16 and has the push rod 10 passed therethrough. Accordingly, it is possible to mount the pump operator directly on top of the pump structure as shown in Figure 1.

While there has been described and illustrated only preferred forms of the invention, it is appreciated that variations may be made without departing from the spirit thereof. Accordingly, limitation is sought only in accordance with the scope of the following claims.

Having described the invention, what is claimed as new is:

1. An operator for a pump which includes a push rod, comprising a housing having a transmission therein, a motor, means mounted for adjustment on said housing supporting said motor and including a pair of rods, means drivingly connecting said motor and said transmission, a cross head mounted for sliding movement on the rods which form a portion of said motor supporting means, arms drivingly fixed to said transmission and said cross head, a guide passed through said housing, the push rod disposed in said guide and means fixing said push rod to said cross head, including an adjustable element carried by said rod, and a spring reacting on said cross head and said element.

2. An operator for a pump which includes a push rod, comprising a housing having a transmission therein, a motor, means mounted for adjustment on said housing supporting said motor and including a pair of rods, means drivingly connecting said motor and said transmission, a cross head mounted for sliding movement on the rods which form a portion of said motor supporting means, arms drivingly fixed to said transmission and said cross head, a guide passed through said housing, the push rod disposed in said guide and means fixing said push rod to said cross head intermediate the ends thereof, said fixing means including an adjustable element carried by said rod, and a spring reacting on said cross head and said element, lubricant receptors carried by said cross head exteriorly of said housing and having said rods which form a portion of said motor supporting means passed therethrough.

MELTON G. RABON.

REFERENCES CITED

The following references are of record in the file of this patent:

UNITED STATES PATENTS

| Number | Name | Date |
|---|---|---|
| 397,882 | Westamy | Feb. 12, 1889 |
| 1,326,731 | Hinze et al. | Dec. 30, 1919 |
| 1,437,988 | Myers | Dec. 5, 1922 |
| 1,654,558 | Sperry | Jan. 3, 1928 |
| 2,038,125 | Patterson et al. | Apr. 21, 1936 |